United States Patent [19]

Chew

[11] Patent Number: 5,507,567
[45] Date of Patent: Apr. 16, 1996

[54] SYSTEM FOR INITIATING REAR BRAKING IN A RAILWAY TRAIN AND AIR SENSOR FOR USE WITH THE SAME

[75] Inventor: James P. Chew, Jeannette, Pa.

[73] Assignee: Union Switch & Signal Inc., Pittsburgh, Pa.

[21] Appl. No.: 388,202

[22] Filed: Feb. 13, 1995

Related U.S. Application Data

[62] Division of Ser. No. 131,776, Oct. 4, 1993, Pat. No. 5,460, 435.

[51] Int. Cl.$^6$ ................................................. B60T 15/46
[52] U.S. Cl. ........................ 303/47; 303/15; 303/DIG. 3
[58] Field of Search ................................... 303/86, 47, 7, 303/9.62, 15, 20, 35, 8 C, DIG. 3, 69; 200/600

[56] References Cited

U.S. PATENT DOCUMENTS

| | | | |
|---|---|---|---|
| 672,917 | 4/1901 | Schmid | 303/47 |
| 1,707,273 | 4/1929 | McCune . | |
| 1,919,424 | 7/1933 | Farmer | 303/21 |
| 2,061,916 | 11/1936 | Miller | 303/15 |
| 2,258,783 | 10/1941 | McNeal | 303/47 |
| 3,374,035 | 3/1968 | Howard | 303/20 |
| 3,539,226 | 11/1970 | Barber | 303/16 |
| 3,710,209 | 1/1973 | Webb et al. | 317/249 |
| 3,901,562 | 8/1975 | Powell et al. | 303/86 |
| 4,043,605 | 8/1977 | Hart | 303/37 |
| 4,113,319 | 9/1978 | Zoric | 303/37 |
| 4,361,825 | 11/1982 | Shockley | 340/52 |
| 4,415,781 | 11/1983 | Frame et al. | 200/5 |
| 4,641,892 | 2/1987 | Schmid | 303/47 |
| 4,852,443 | 8/1989 | Duncan et al. | 84/1 |
| 4,920,343 | 4/1990 | Schwartz | 341/33 |
| 5,090,780 | 2/1992 | Powell | 303/15 |

FOREIGN PATENT DOCUMENTS 3634653 12/1987 Germany ................................. 303/47

OTHER PUBLICATIONS

WABCO "26-L" Locomotive Air Brake Equipment and Devices, Westinghouse Air Brake Division, American Standard Inc., Jan., 1988.

*Primary Examiner*—Robert J. Oberleitner
*Assistant Examiner*—Peter M. Poon
*Attorney, Agent, or Firm*—Buchanan Ingersoll; Michael L. Dever

[57] ABSTRACT

A system is disclosed to selectively initiate braking at a rear section of a railway train upon initiation of a selected front braking condition at the front section of the railway vehicle. The system utilizes an air sensor preferably constructed in the form of an insect excluder device to detect release of brake pipe air from an exhaust port upon initiation of braking at the front section of the vehicle. An appropriate signal is produced by the air sensor, thus permitting detector circuitry to detect that front braking has been initiated. A transmitter, typically located in the cab of the locomotive, is electrically connected to the detector circuitry. When the detector circuitry indicates that the selected front braking condition has been initiated, the transmitter transmits a brake initiation signal to a receiver located at the rear of the vehicle. The receiver then actuates pneumatic braking equipment at the rear to initiate rear braking. The air sensor may include a generally rigid insect shield connected to actuate the armature of an electrical switch upon passage of air. Such an air sensor may also be constructed utilizing a deformable insect shield configured to operate as a variable capacitor when air passes through the exhaust port. If connected in a resonant circuit, this variable capacitor may provide a detectable voltage variation which can be used to indicate initiation of front braking.

7 Claims, 4 Drawing Sheets

5,507,567

SYSTEM FOR INITIATING REAR BRAKING IN A RAILWAY TRAIN AND AIR SENSOR FOR USE WITH THE SAME

This application is a division of application Ser. No. 08/131,776, filed Oct. 4,1993, now U.S. Pat. No. 5,460,435.

BACKGROUND OF THE INVENTION

1. Field of the Invention

The present invention relates generally to systems for initiating braking at the rear of a railway train. More particularly, the present invention relates to an invention which utilizes an air sensor to detect passage of air through an exhaust port of a brake pipe vent valve for the purpose of initiating braking at the rear of a train.

2. Description of the Prior Art

Many railway vehicles in service today utilize an air brake system whereby brake mechanisms on individual cars are actuated by selected pressure variations within a brake pipe extending the length of the vehicle. Typically, braking is initiated by an operator in the locomotive operating a brake valve which exhausts air within the brake pipe to atmosphere. The concomitant reduction in brake pipe pressure propagates through the brake pipe at a speed approaching the speed of sound. As this brake pipe pressure reduction passes a particular car, the braking mechanism present on that car is actuated.

Despite the relatively rapid propagation speed of the brake pipe pressure signal, a noticeable time delay may exist in long trains before a pressure reduction initiated in the locomotive will actuate braking mechanisms in cars located at the rear. Because of the this period in which some cars will be in a braking condition while others will not, severe intratrain forces are often present during the braking operation. To reduce these intratrain forces as well as to provide a degree of redundancy, it is desirable to also have the capability of initiating braking at the rear of the train when a braking condition has been commanded in the locomotive.

Recently, many railroads have begun operating freight trains with no attached caboose. When no caboose is used, it is common practice to apply an end-of-train monitor (EOTM) unit to the last car of the train. The EOTM unit will typically transmit data concerning brake pipe pressure to an EOTM cab unit located in the locomotive. Additionally, some EOTM units are capable of initiating a braking condition at the rear of the train when a proper command is received from the EOTM cab unit.

In some cases, a braking condition may be initiated in a railway vehicle even though it has not been requested by the vehicle operator. For example, the locomotive and various cars are typically equipped with emergency braking mechanisms which are responsive to reductions in brake pipe pressure exceeding a predetermined threshold rate when this rate is exceeded, whether intentionally or unintentionally, brake pipe vent valves automatically open to further facilitate release of brake pipe air to atmosphere. This causes the brake pipe pressure to be reduced by an even greater rate. As this increasing brake pipe pressure reduction is sensed by the various emergency braking mechanisms, an emergency brake application is applied to each railway vehicle. Examples of situations which may initiate an emergency brake pipe reduction in the absence of operator command include a large hole in the brake pipe, a pull-apart of the hose couplings or a faulty emergency mechanism on one of the cars. The current systems utilizing an EOTM monitor, however, have generally been incapable of initiating rear brake venting in the event of such an emergency braking condition.

SUMMARY OF THE INVENTION

The present invention provides a system to selectively initiate braking at the rear of a railway train upon initiation of an emergency braking condition at the front. The system includes an air sensor mounted on an exhaust port of a brake pipe vent valve typically located in the locomotive of the train. When emergency braking is initiated at the front of the vehicle, the brake pipe vent valve automatically opens to release air through the exhaust port. An appropriate signal is produced by the air sensor, thus permitting detector means to detect that the front end emergency braking condition has been initiated. Appropriate transmitter means, typically located in the cab of the locomotive, are electrically connected to the detector means. When the detector means indicates that the front end emergency braking condition has been initiated, the transmitter means transmits a brake initiation signal to receiver means located at the rear. The receiver means then actuates pneumatic braking equipment at the rear to initiate rear end venting of the brake pipe.

In presently preferred embodiments, the air sensor comprises a modified insect excluder device mounted on the end of the exhaust port. An insect excluder device functioning as an air sensor may include a generally rigid insect shield connected to actuate the armature of an electrical switch upon passage of venting air. Such an air sensor may also be constructed utilizing a deformable insect shield configured to operate as a variable capacitor when air passes through the exhaust port. When connected in a resonant circuit, this variable capacitor may provide a detectable voltage variation which can be used to indicate that the front end emergency braking condition has been initiated.

DETAILED DESCRIPTION OF PRESENTLY PREFERRED EMBODIMENTS

Figure 1:
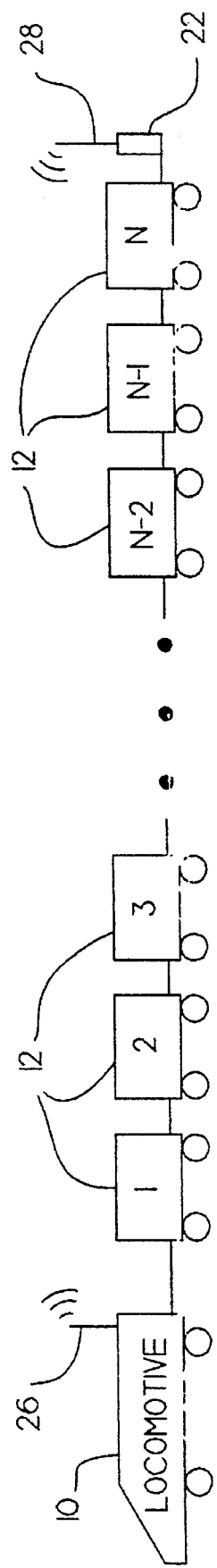
FIG. 1 is a diagrammatic representation of a railway train equipped with a system for initiating rear braking.

FIG. 1 diagrammatically illustrates a railway train equipped according to the teachings of the present invention. A locomotive 10, located at the front section of the train, is coupled to a plurality of railway cars 12. A brake pipe extends the length of the vehicle, interconnecting locomotive 10 and cars 12 into a common pneumatic brake system. When used to transport freight, it is not unusual for such a train to have a total number, N, of cars 12 exceeding one hundred and fifty (150). As such, a pressure signal initiated in locomotive 10 may take an appreciable amount of time to propagate along the brake pipe to cars located at the rear (car N). Particularly in the case of an emergency braking condition, this delay due to the propagation time of the pressure signal may cause significant intratrain forces as discussed above.

Figure 2:
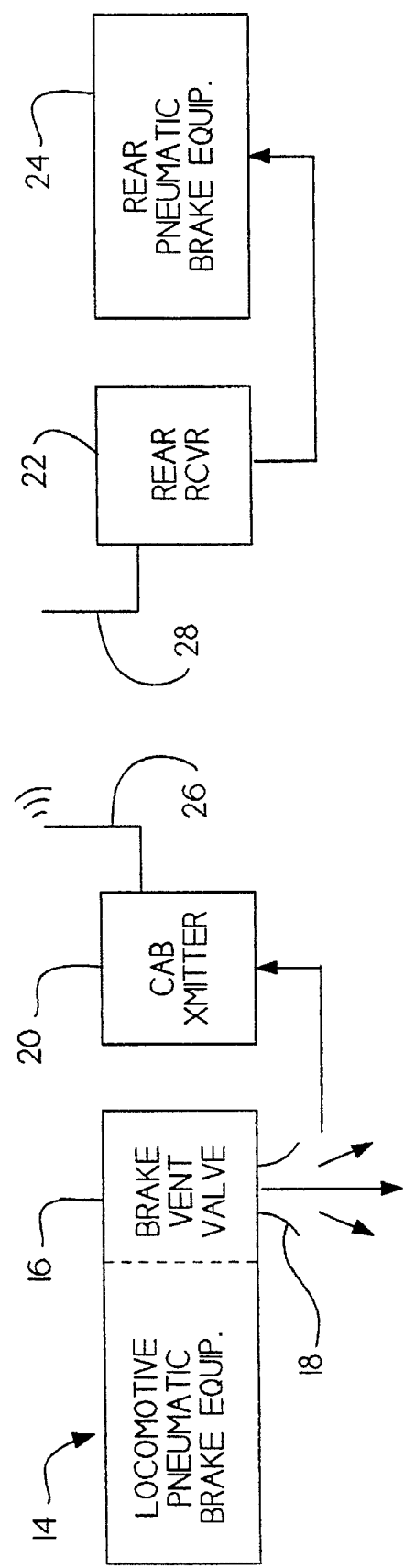
FIG. 2 is a diagrammatic representation of the system for initiating rear braking utilized by the railway vehicle of FIG. 1.

As can be seen more clearly in FIG. 2, the present invention reduces these intratrain forces by also initiating braking at the rear section of the train. The system advantageously uses an operating characteristic of the pneumatic brake equipment (generally referenced as 14). As can be seen, pneumatic brake equipment 14 includes a brake pipe vent valve 16, such as a number 8 vent valve marketed by New York Air Brake Company and Westinghouse Air Brake Company. During an emergency braking condition, brake pipe vent valve 16 operates to release pneumatic fluid (typically air) in the brake pipe to atmosphere through an exhaust port 18. Passage of this fluid is sensed according to the present invention by a suitable air sensor mounted on exhaust port 18. Signals produced by the air sensor are therefore used to indicate that an emergency braking condition exists at the front section of the train. An advantage of this technique is that an indication of an emergency braking condition may be provided whether its occurrence has been desired or undesired.

Upon detection of the emergency braking condition as described, a cab transmitter 20 will transmit a selected brake initiation signal to a receiver 22 located at the rear of the railway vehicle. Receiver 22 then actuates rear end pneumatic brake equipment (collectively referenced as 24) to initiate braking at the rear section of the train. In presently preferred embodiments cab transmitter 20 and rear receiver 22 communicate using radio signals transmitted and received via antennas 26 and 28. Appropriate apparatus including a suitable transmitter and receiver may be supplied by Union Switch & Signal, Inc., Corporate Drive, Pittsburgh, Pennsylvania, the assignee of the present invention. Some equipment utilized in presently preferred embodiments could include the following: rear sense and brake unit (SBU) Model No. 6651, front communications and logic unit (CLU) Model No. 6652, and front input and display unit (IDU) Model No. 6653.

Figure 3:
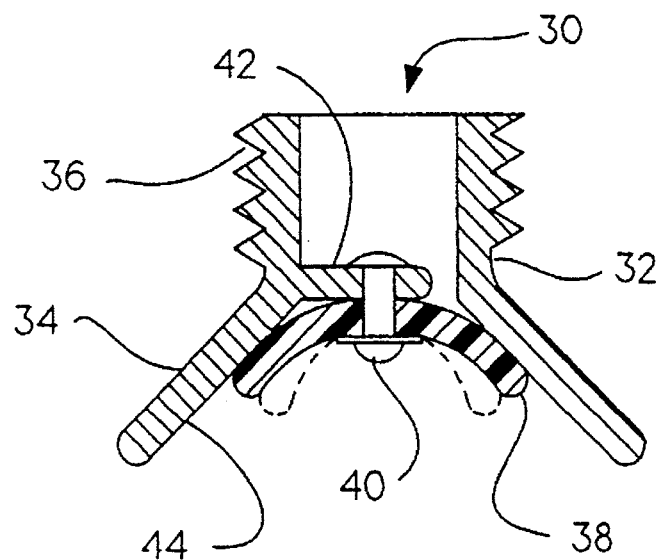
FIG. 3 is a partial cross sectional view of a prior art insect excluder device.

To detect passage of brake pipe fluid released by brake pipe vent valve 16, the present invention utilizes an important modification of an otherwise electrically passive device. The device, an insect excluder, is mounted to the end of exhaust port 18 to prevent foreign objects, such as insects, from contaminating the inner workings of valve 16. FIG. 3 illustrates a typical prior art insect excluder device 30. As can be seen, device 30 has a body member having an upper cylindrical portion 32 and a lower generally conical portion 34. Upper portion 32 includes a series of external threads 36 which engage complementary threads in exhaust port 18. Device 30 further includes a deformable shield member 38 typically constructed of rubber or other appropriate resilient material. As shown, shield member 38 is coaxially mounted within lower portion 34 by a rivet 40 extending through a lip 42 protruding into the opening of device 30. Normally, the outer periphery of shield member 38 rests against the inner surface 44 of lower portion 34. Pressure of air, however, through device 30 will push shield member 38 slightly open as shown by the phantom lines. As such, the air will be allowed to pass out through exhaust port 18 into the ambient atmosphere.

Figure 4:
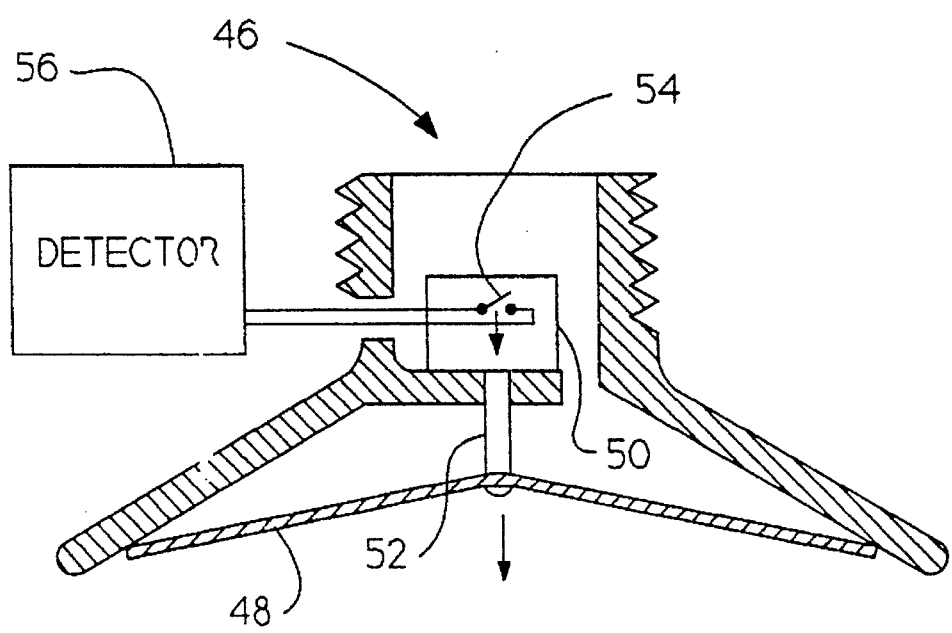
FIG. 4 is a partial cross sectional view of one presently preferred embodiment of an air sensor.

FIG. 4 illustrates one presently preferred embodiment of an air sensor 46 constructed in accordance with the invention. As can be seen, air sensor 46 is similar in many respects to insect excluder device 30 and will also function to prevent foreign objects from entering brake pipe vent valve 16. Instead of a deformable shield member, however, air sensor 46 has a rigid shield member 48 which is connected to an electrical switch 50 via linkage 52. Linkage 52 in this case closes the armature 54 of switch 50 when shield member 48 is pushed downward by escaping air. As a result, a circuit is completed across output lines from switch 54 to a detector 56 which may be used to indicate the passage of air through air sensor 46. Normally, shield member 48 is urged into a retracted position by a spring or other appropriate bias means within switch 50.

Figure 5:
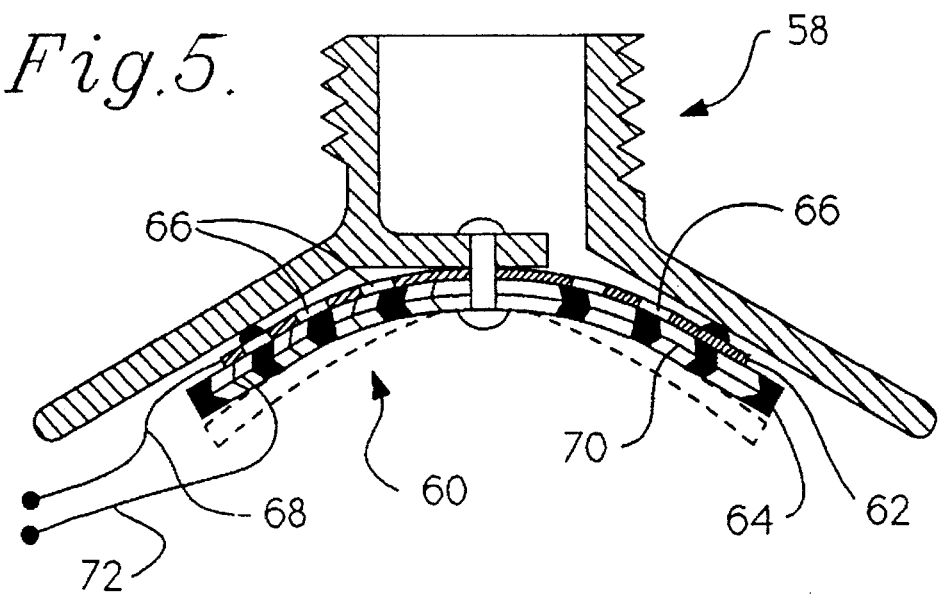
FIG. 5 is a partial cross sectional view of another presently preferred embodiment of an air sensor.
Figure 5A:
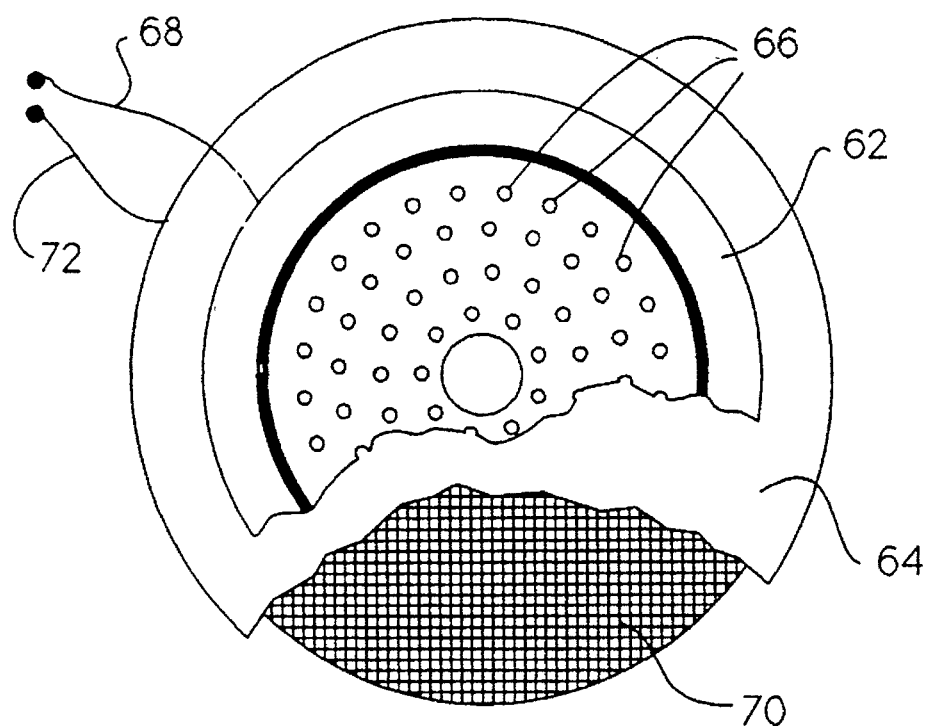
FIG. 5A is a top view of the insect shield utilized in the air sensor of FIG. 5 with portions partially broken away to reveal the various components.

FIG. 5 illustrates an alternative air sensor 58 which may also be used to sense passage of air through exhaust port 18. As with air sensor 46, air sensor 58 will also function to prevent undesired foreign objects from entering brake vent valve 16. Instead of switching, however, air sensor 58 is configured to produce a variation in electrical impedance as air passes from exhaust port 18. Particularly, air sensor 58 has a deformable shield member 60 which functions as a variable capacitor when brake pipe air is released by valve 16. As can be seen more clearly in FIG. 5A, shield member 60 has an upper disc member 62 and a lower disc member 64 which are normally contiguous. Upper disc member 62 is preferably constructed of a rigid, conductive material such as steel. Transmission of brake pipe air through upper disc 62 is facilitated by a plurality of perforations 66 extending therethrough. Lower disc member 64 is generally constructed of a resilient material and deforms to permit passage of air as shown by the phantom lines in FIG. 5.

In basic terms, a capacitor can be thought of as a pair of conductive plates separated by an insulator. If the configuration of a particular capacitor is changed by, for example, separating the plates, the impedance which the capacitor presents to an electric circuit will also change. In this case, upper disc member 62, which is connected to a first output line 68, functions as the upper plate of a variable capacitor. A lower plate 70 of the variable capacitor is here formed by embedding a circular section of wire mesh within lower disc member 64, which functions as the dielectric. Wire mesh is preferably utilized for plate 70 to provide adequate conductivity while permitting lower disc member 64 to easily deform when necessary. A second output line 72 is electrically connected to lower plate 70.

Figure 6:
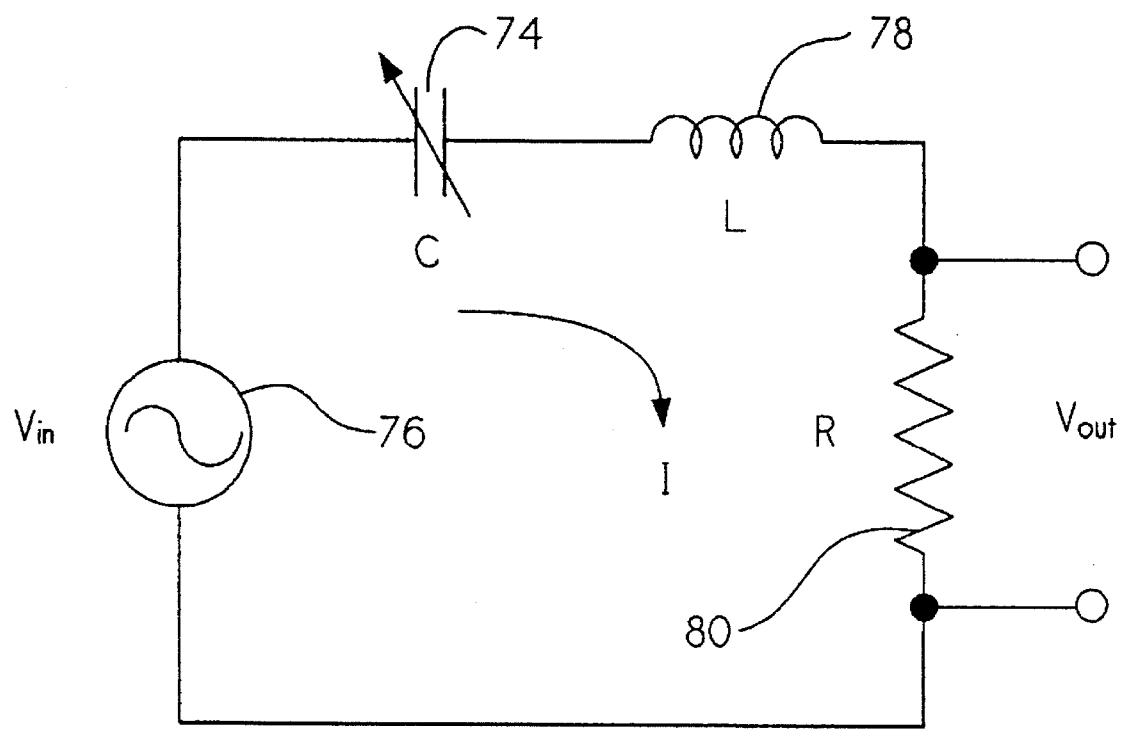
FIG. 6 is a schematic diagram of a series resonant circuit incorporating the air sensor of FIG. 5 as a variable capacitive element.

A resonant circuit which may be used to detect the changing impedance of a variable capacitor 74 produced by the configuration of shield member 60 is illustrated in FIG. 6. There, an AC source 76 is shown supplying electrical energy to a series resonant circuit which includes capacitor 74 along with an inductor 78 and a resistor 80. The frequency of AC source 76 is here chosen such that the circuit is resonant when shield member 60 is in its "at rest" position with lower disc member 64 contiguous with upper disc member 62. During this time, the capacitance of capacitor 74 will remain relatively constant and the current, I, passing through the circuit will be maximum. As a result, the voltage $V_{OUT}$ will be relatively near the value of the input voltage $V_{IN}$ produced by source 76. However, movement of lower disc 64 in response to passage of air through exhaust port 18 will temporarily decrease the capacitance of capacitor 74. This will cause a momentary dip in the voltage $V_{OUT}$ which may easily be detected. Alternatively, a resonant circuit arrangement may be utilized in which the value of voltage $V_{OUT}$ will momentarily increase as air passes through exhaust port 18. Additionally, it is contemplated parallel resonant circuits may also be used to sense passage of air through air sensor 58.

It can thus be seen that the invention provides a system to selectively initiate rear braking at a rear section of a railway vehicle. The system utilizes an air sensor preferably constructed in the form of an insect excluder device to detect release of brake pipe air upon initiation of braking at the front section of the vehicle. While presently preferred embodiments of the invention have been shown and described, it is to be distinctly understood that the invention is not limited thereto but may be otherwise variously practiced and embodied within the scope of the following claims.

I claim:

1. A system to selectively initiate rear braking at a rear section of a railway train equipped with a brake pipe vent valve operative to release air through an exhaust port upon initiation of a selected front braking condition at a front section of the railway train, said system comprising:

receiver means mountable at said rear section of said railway train for initiating said rear braking upon receipt of a selected brake initiation signal;

an air sensor mountable on said exhaust port at a front portion of such train to indicate passage of gaseous fluid therethrough, said air sensor comprising an insect excluder device mountable to an end of said exhaust port;

detector means electrically connected to said air sensor for detecting initiation of the selected front braking condition based on passage of said gaseous fluid through said exhaust port; and transmitter means mountable at said front section of said railway train and electrically connected to said detector means for transmitting said selected brake initiation signal to said receiver means when said detection means indicates initiation of the front end braking condition.

2. The system of claim 1 wherein said insect excluder device includes switching means for actuation upon passage of said gaseous fluid through said exhaust port.

3. The system of claim 2 wherein said switching means comprises a movable insect shield and an electrical switch, said movable insect shield connected to actuate an armature of said electrical switch.

4. The system of claim 1 wherein said insect excluder device includes capacitor means responsive to passage of said gaseous fluid through said exhaust port for producing a variable capacitance indicative of flow of said gaseous fluid.

5. The system of claim 4 wherein said capacitor means is connected as an element in a resonant circuit.

6. A system to selectively initiate rear braking at a rear section of a railway train equipped with a brake pipe vent valve operative to release air through an exhaust port upon initiation of a selected front braking condition at a front section of the railway train, said system comprising:

receiver means mountable at said rear section of said railway train for initiating said rear braking upon receipt of a selected brake initiation signal;

an air sensor mountable on said exhaust port at a front portion of such train to indicate passage of gaseous fluid therethrough, said air sensor comprising an insect excluder device mountable to an end of said exhaust port, said insect excluder device including capacitor means responsive to said passage of said gaseous fluid through said exhaust port for producing a variable capacitance indicative of flow of said gaseous fluid, wherein said insect excluder device comprises a deformable insect shield generally constructed of a resilient dielectric material, said deformable insect shield further having a conductive capacitor plate generally embedded within said resilient dielectric material;

detector means electrically connected to said air sensor for detecting initiation of the selected front braking condition based on passage of said gaseous fluid through said exhaust port; and transmitter means mountable at said front section of said railway train and electrically connected to said detector means for transmitting said selected brake initiation signal to said receiver means when said detection means indicates initiation of the from end braking condition.

7. The system of claim 6 wherein the conductive capacitor plate comprises a deformable wire mesh.

* * * * *

UNITED STATES PATENT AND TRADEMARK OFFICE
CERTIFICATE OF CORRECTION

PATENT NO. : 5,507,567
DATED : April 16, 1996
INVENTOR(S) : JAMES P. CHEW

It is certified that error appears in the above-indentified patent and that said Letters Patent is hereby corrected as shown below:

Column 6, line 37, claim 6, change "from" to --front--.

Signed and Sealed this

Twenty-seventh Day of August, 1996

*Attest:*

BRUCE LEHMAN

*Attesting Officer*      Commissioner of Patents and Trademarks